(12) United States Patent
Marin et al.

(10) Patent No.: US 6,745,573 B2
(45) Date of Patent: Jun. 8, 2004

(54) INTEGRATED AIR SEPARATION AND POWER GENERATION PROCESS

(75) Inventors: Ovidiu Marin, Lisle, IL (US); Jean-Pierre Maricourt, Oak Park, IL (US); Olivier Charon, Chicago, IL (US); Pietro DiZanno, Ruel Malmaison (FR)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/942,269

(22) Filed: Aug. 28, 2001

(65) Prior Publication Data

US 2002/0166323 A1 Nov. 14, 2002

Related U.S. Application Data

(60) Provisional application No. 60/278,213, filed on Mar. 23, 2001.

(51) Int. Cl.$^7$ .............................. F02C 3/30; F02C 6/04
(52) U.S. Cl. .................... 60/775; 60/39.12; 60/39.55; 60/39.181; 60/781
(58) Field of Search ...................... 60/39.12, 39.55, 60/39.181, 775, 781

(56) References Cited

U.S. PATENT DOCUMENTS

| | | | |
|---|---|---|---|
| 3,628,332 A | 12/1971 | Kelmar | |
| 4,099,382 A | 7/1978 | Paull et al. | |
| 4,116,005 A | 9/1978 | Willyoung | |
| 4,382,366 A | 5/1983 | Gaumer | |
| 4,910,963 A | 3/1990 | Vanzo | |
| 5,027,720 A | 7/1991 | Merritt et al. | |
| 5,040,370 A | 8/1991 | Rathbone | |
| 5,129,331 A | 7/1992 | Merritt et al. | |
| 5,265,424 A | 11/1993 | Merritt | |
| 5,388,395 A | 2/1995 | Scharpf et al. | |
| 5,406,786 A | 4/1995 | Scharpf et al. | |
| 5,657,624 A | 8/1997 | Kang et al. | |
| 5,680,764 A | 10/1997 | Viteri | |
| 5,709,077 A | 1/1998 | Beichel | |
| 5,715,673 A | 2/1998 | Beichel | |
| 5,740,673 A | * 4/1998 | Smith et al. ............... | 60/39.12 |
| 5,937,652 A | 8/1999 | Abdelmalek | |
| 5,956,937 A | 9/1999 | Beichel | |
| 5,970,702 A | 10/1999 | Beichel | |
| 6,047,547 A | 4/2000 | Heaf | |
| 6,071,116 A | 6/2000 | Philippe et al. | |

(List continued on next page.)

FOREIGN PATENT DOCUMENTS

| | | |
|---|---|---|
| EP | 0453059 | 10/1991 |
| EP | 0926317 | 6/1999 |
| EP | 1 172 135 A1 | 1/2002 |
| JP | 11200886 | 7/1999 |
| JP | 2001 41402 | 2/2001 |
| JP | 2001 56104 | 2/2001 |
| WO | WO 97/44574 | 11/1997 |

OTHER PUBLICATIONS

Babcock & Wilcox, Steam, Its Generation and Use, 1978, pp34–10 to 34–25, 39$^{th}$ Edition.

(List continued on next page.)

*Primary Examiner*—Michael Koczo
(74) *Attorney, Agent, or Firm*—Linda K. Russell; Christopher J. Cronin

(57) ABSTRACT

An integrated air separation and power generation process produces an $O_2$-enriched gas stream and an $N_2$-enriched gas stream in an air separation unit. The $O_2$-enriched gas stream is introduced with fuel and steam to a combustor, producing flue gas. At least a portion of the flue gas and steam stream exiting the combustor is used to generate power. The $N_2$-enriched gas stream is heated and power is generated from the heated $N_2$-enriched gas stream.

30 Claims, 7 Drawing Sheets

U.S. PATENT DOCUMENTS

| | | |
|---|---|---|
| 6,113,389 A | 9/2000 | Joshi et al. |
| 6,141,950 A * | 11/2000 | Smith et al. ............... 60/39.55 |
| 6,170,264 B1 | 1/2001 | Viteri et al. |
| 6,247,315 B1 | 6/2001 | Marin et al. |
| 6,250,916 B1 | 6/2001 | Philippe et al. |
| 6,256,994 B1 | 7/2001 | Dillon, IV |
| 6,263,659 B1 | 7/2001 | Dillon, IV et al. |
| 6,264,466 B1 | 7/2001 | Joshi et al. |
| 6,273,180 B1 | 8/2001 | Joshi et al. |
| 6,276,928 B1 | 8/2001 | Joshi et al. |
| 6,282,901 B1 | 9/2001 | Marin et al. |
| 6,301,873 B2 * | 10/2001 | Hannemann et al. ...... 60/39.12 |
| 6,314,896 B1 | 11/2001 | Marin et al. |
| 6,345,493 B1 * | 2/2002 | Smith et al. .................. 60/781 |

OTHER PUBLICATIONS

Yantovskii, E.I., The Themodynamics of Fuel–Fired Power Plants Without Exhaust Gases, World Clean Energy Conference, Geneva, Nov. 1991, Institute for Energy Research, U.S.S.R. Academy of Sciences, Moscow, U.S.S.R..

Mathieu, Ph., and Nihart, R., Sensitivity Analysis of the Matiant Cycle, pp. 775–787, University of Liege, Institut de Mecanique, Belgium.

* cited by examiner

INTEGRATED AIR SEPARATION AND POWER GENERATION PROCESS

FIELD OF THE INVENTION

The present invention relates to an integrated air separation and power generation process. More specifically, the present invention relates to a process for separating at least oxygen and nitrogen from air and integrating the use of oxygen and nitrogen into a process for efficiently generating electrical power.

BACKGROUND DISCUSSION

Cogeneration involves using a single fuel source to simultaneously produce, in the same facility, thermal energy, usually in the form of steam, and electric energy. Since the Public Utility Regulatory Policy Act of 1978, owners of cogeneration facilities have been given a financial incentive to sell excess electrical power to utility companies, while utilities are encouraged to purchase that electrical power. Consequently, there has been a continuing effort to improve the energy efficiency of cogeneration plants, particularly in the United States. Moreover, the rising and volatile costs of natural gas have increased the economic incentive for many cogeneration plants to use other fuel sources, such as coal, for example.

Many cogeneration processes use an integrated, high-efficiency combined cycle to increase efficiency. Typically, a combined cycle is a steam turbine (i.e., Rankine-cycle) thermodynamically coupled with a gas turbine (i.e., Brayton-cycle). Steam and gas turbine combined cycle systems are often used where natural gas is the fuel source because natural gas tends to have a lower concentration of impurities that can cause hot corrosion, fouling and rapid deterioration in the gas turbine parts, particularly gas turbine blade surfaces. Therefore, historically, use of high-efficiency steam/gas combined cycle systems has been discouraged where coal is used as a fuel source due to the various impurities in coal that can cause gas turbine corrosion. Consequently, when using a steam/gas combined cycle in a coal combustion cogeneration process, it is important to limit the gas turbine's exposure to flue gas impurities and temperatures significantly exceeding the maximum admissible value. The maximum admissible temperature for a gas turbine is primarily dictated by the gas turbine's materials of construction and its other operating conditions and is typically in a range of from about 1000° C. to about 1450° C. Limiting exposure to flue gas impurities and higher temperatures will help forestall significant corrosion problems with the gas turbine and, thereby, keep equipment maintenance costs down.

U.S. Pat. No. 4,116,005 by Willyoung proposes using a fluidized combustor bed containing sulfur-sorbing particles that are fluidized by a gas turbine's air exhaust, at about atmospheric pressure, which also provides an $O_2$ source for the coal's combustion. However, Willyoung's proposed system fails to further enhance the inherent efficiency of using a steam/gas combined cycle in a cogeneration process. Also, Willyoung's modification of the combustion chamber with a fluidized bed requires significant expense and upkeep for limiting gas turbine corrosion.

Another factor challenging many coal fired cogeneration processes are gaseous emissions into the atmosphere, particularly nitrogen oxides ($NO_x$), such as nitrogen oxide (NO), nitrogen dioxide ($NO_2$) and nitrous oxide ($N_2O$), sulfur oxides ($SO_x$), such as sulfur dioxide ($SO_2$) and sulfur trioxide ($SO_3$), and carbon dioxide ($CO_2$). Some global warming proponents relate excess $N_2O$ and $CO_2$ emissions to climatological change. Also, $NO_x$ emissons, such as NO or $NO_2$, in sufficient concentration, can be toxic to health and the environment. Additionally, $SO_x$ emissions, in sufficient concentration, can contribute to the production of "acid rain," which can have a detrimental effect on various plant and aquatic life. Thus, it is possible that many or all of these gases could become more stringently regulated, at least in certain market-developed countries or regions, such the United States, Canada, Japan and Europe. Consequently, this prospect of increasing regulatory stringency for some or all gaseous emissions that are typically coal combustion by-products has made coal-fueled cogeneration processes less attractive from an operational cost standpoint.

For instance, various countries, including, among others, France, Germany, the United Kingdom, Australia, the United States, Canada and Japan have agreed to seek international approval and adoption, within their respective jurisdictions, of the Kyoto Protocol. The Kyoto Protocol ensued from the United Nations Framework Convention on Climate Change, held in December, 1997 at Kyoto, Japan. Under the Kyoto Protocol each participant agreed in principle to "implement and/or further elaborate policies and measures in accordance with its national circumstances" to, among other things, enhance energy efficiency and protect reservoirs of certain atmospheric gases not controlled by the Montreal Protocol (e.g., $CO_2$).

Generally, under the Kyoto Protocol the participating countries agreed to limit emissions of greenhouse gases specified under the Protocol, including $CO_2$, methane ($CH_4$), $N_2O$, hydrofluorocarbons (HFCs), perfluorocarbons (PFCs) and sulfur hexafluoride ($SF_6$), as well as work towards reducing the overall emissions of these gases by at least 5 percent below 1990 levels in the target period of 2008 to 2012. To date, no legislative amendments to the U.S. Clean Air Act Amendments of 1990 (CAAA) have been passed that would require facilities operating in the U.S. to comply with the Kyoto Protocol greenhouse gas emissions target. Nonetheless, the 1996–2000 U.S. administration has made a policy decision to promote voluntary compliance with the Kyoto Protocol. Accordingly, companies operating in the U.S. that have significant $CO_2$ emissions have been encouraged to voluntarily work towards the Kyoto Protocol's target level for the greenhouse gases specified. Also, if good progress towards the Protocol's goals is not shown, it is possible that some further amendments to the CAAA could flow from the Kyoto Protocol. CAAA amendments conforming with the Kyoto Protocol could also be motivated if models are developed to more definitively measure and predict the extent of global climate changes based on current and projected gaseous emissions. Thus, limiting the gaseous emissions, particularly from coal-fueled power generation plants, while maintaining an energy efficient power generation process is becoming a more important commercial objective.

For example, U.S. Pat. No. 5,937,652 by Abdelmalek proposes to produce energy more efficiently and reduce $CO_2$ emissions from a combined coal gasification and synthesis gas (i.e., a carbon monoxide (CO) and hydrogen gas ($H_2$) mixture) combustion process. The coal gasification step is conducted under an oxygen ($O_2$) free atmosphere, while using $CO_2$ and steam as oxidants for the coal fuel. The heat from the coal/$CO_2$ gasification reaction is used to produce steam for driving a steam turbine/generator that produces electricity. Also, Abdelmalek separates $CO_2$ from sulfur dioxide ($SO_2$) and other gases discharged from a boiler using a cyclone separator system disclosed in U.S. Pat. Nos. 5,403,569 and 5,321,946.

Abdelmalek indicates that the process has a higher efficiency because the gasification reaction is run without $O_2$, while the separated $CO_2$, which is recycled back to the gasification chamber for reacting with coal, produces a nitrogen ($N_2$) free synthesis gas, namely a CO and $H_2$ mixture. This $CO/H_2$ mixture is then combusted with $O_2$ to generate heat. According to Abdelmalek, the gross heat value of his combined coal gasification, where little to no $O_2$ is present, and synthesis gas combustion process, where CO and $H_2$ are reacted with $O_2$ to produce the principle heat, is 20% greater versus conventional coal combustion processes, where coal is burned using $O_2$ as a principle oxidant. Abdelmalek also contends that his process reduces $CO_2$ emissions by 20%. Moreover, Abdelmalek teaches that the combustion reaction chemistry, particularly where coal is a fuel source (e.g., coal+$O_2$), makes conventional combustion type reactions inherently limited in the extent to which they can be made any more efficient, even in the context of a cogeneration process. Consequently, Abdelmalek fails to disclose how to improve the efficiency of a cogeneration process primarily using direct combustion of a fuel, such as coal, and/or reduce $CO_2$ emissions to the atmosphere, as well as other gaseous emissions, such as nitrous oxide (NO), nitrous oxide ($N_2O$) and nitrogen dioxide ($NO_2$), (collectively called $NO_x$) and/or sulfur dioxide ($SO_2$) and sulfur trioxide ($SO_3$) (collectively called $SO_x$).

Another example of producing $CO_2$ and energy from the same process and fuel source is disclosed in U.S. Pat. No. 6,047,547 by Heaf. Heaf proposes a portable integrated cogeneration system that produces electric power, steam and liquid $CO_2$ and other products necessary for producing and filling bottled or canned beverage products. Specifically, Heaf proposes using a combustion engine generator (CEG) to produce electric power and a combustion powered water boiler to produce steam. A $CO_2$ recovery unit connected with the CEG and water boiler receives exhaust gases from the CEG and water boiler for separating and recovering $CO_2$ from the exhaust gases and a compressor is used to liquefy the recovered $CO_2$. Heaf suggests that his cogeneration system can produce large quantities of $CO_2$ from one and preferably both the CEG and the combustion powered water boiler. But, with respect to operating efficiency, Heaf only suggests that his integrated cogeneration system "is efficient and saves costs when incorporated into a beverage production facility." But Heaf fails to quantify the efficiency of his proposed cogeneration process. Moreover, Heaf fails to disclose any means or methods for improving operating efficiency in combustion powered boiler systems used outside the context of a beverage production and bottling facility.

U.S. Pat. No. 5,067,837 by Rathbone et al is directed to an air separation process in combination with a chemical process. A nitrogen stream produced in the air separation unit is pressurized to at least 5 atmospheres and heated via heat exchange with a hot fluid produced in the chemical process. The heated nitrogen is then expanded in an expansion turbine to produce work. The nitrogen exiting the turbine is: (a) used to heat the oxygen or fuel in a heat exchanger; (b) vented to the atmosphere; or (c) used to raise steam in a steam generator. However, Rathbone suggests using $O_2$ in a partial oxidation type reaction where purified natural gas is reacted with $O_2$ to form a synthesis gas with a desired CO content (i.e., a gasification process). Also, Rathbone suggests using $N_2$ heated only with a hot synthesis gas produced from a gasification process, rather than a combustion process that oxidizes the fuel more completely to produce a flue gas primarily comprising $CO_2$ and, where natural gas is the fuel, $CO_2$ and water vapor, among other reaction products. Moreover, Rathbone fails to disclose any means or methods for improving operating efficiency in combustion powered boiler systems used outside the context of a natural gas gasification process.

U.S. Pat. No. 5,709,077 (Jan. 20, 1998), U.S. Pat. No. 5,715,673 (Feb. 10, 1998), U.S. Pat. No. 5,956,937 (Sep. 28, 1999) and U.S. Pat. No. 5,970,702 (Oct. 26, 1999), all by Beichel and assigned to Clean Energy Systems, Inc. (Sacramento, Calif.), describe a power generation system in which high pressure fuel and high pressure $O_2$ are burned in a gas generator to generate high temperature gas. The combustion temperature is controlled by cooling water injected into a gas mixing chamber in the gas generator. The high pressure, high temperature steam/$CO_2$ mixture from the gas generator is passed through a series of three turbines with inter-turbine reheaters between the turbines. The gas is condensed and water is recycled to the gas generator.

U.S. Pat. No. 5,680,764 (Oct. 28, 1997) by Viteri, also assigned to Clean Energy Systems, Inc., describes a power generation system where pressurized fuel and $O_2$ are fed to a gas generator to achieve complete combustion and maximum temperature hot gases (6,500° R (6,040° F., 3,300° C.). The hot gases are diluted with water to reduce the temperature to 2,000° R (1,540° F., 840° C.). When hydrogen is used as a fuel, the drive gas is steam and when a light hydrocarbon is used, the drive gas is steam and $CO_2$. The hot gas is expanded in a turbine for powering a vehicle and then condensed into water to complete the Rankine cycle. About 75% of the water is recirculated to the gas generator. In one embodiment, the Rankine cycle is replaced with Otto and Diesel thermal cycles to eliminate the need for a condenser and recirculating water system. Depending on the fuel used, low temperature steam (hydrogen fuel) or steam/$CO_2$ (hydrocarbon fuel) gases are recirculated as the working fluid in the Otto and Diesel embodiment.

U.S. Pat. No. 6,170,264 (Jan. 9, 2001), also by Viteri and assigned to Clean Energy Systems, Inc., describes the same process as U.S. Pat. No. 5,680,764 and further suggests using an air separation plant. Enriched $O_2$ is used in a combustion device and enriched $N_2$ is vented to the atmosphere. In one embodiment, $CO_2$ is sequestered into deep underground or undersea locations.

Typically, the overall energy producing efficiency of most coal-fired cogeneration processes is in a range from about 25% to about 35%. Consequently, there is a need for an integrated cogeneration process for producing electrical power and thermal energy with improved efficiency. Preferably, the total efficiency of an improved cogeneration process would be greater than about 40% and, more preferably, greater than about 50%.

Also, the more energy efficient cogeneration process should have a method for reducing corrosion effects on gas turbines used in steam turbine/gas turbine combined cycle, while being adaptable to incorporating, as desired, a system for reducing and/or eliminating various gaseous emissions, such as $CO_2$, $NO_x$ and/or $SO_x$, to the atmosphere.

SUMMARY OF THE INVENTION

According to the invention, there is provided an integrated air separation and power generation process, comprising the steps of:

(a) introducing an $O_2/N_2$ source to an air separation unit;

(b) separating the $O_2/N_2$ source into at least an $O_2$-enriched gaseous stream and an $N_2$-enriched gaseous stream;

(c) introducing at least a portion of the $O_2$-enriched gaseous stream, having a pressure of at least about 3 bars (300 kPa), and fuel to a combustor to produce a combustion mixture;

(d) burning the combustion mixture to produce at least a flue gas;

(e) injecting steam into the combustor, before, during and/or after the combustion mixture burning step, to produce a modified combustion mixture of at least steam and flue gas;

(f) generating power by introducing the modified combustion mixture exiting the combustor into a first power generating means;

(g) heating at least a portion of the $N_2$-enriched gaseous stream, having a pressure of at least 3 bars (300 kPa); and (h) generating power by introducing the heated $N_2$-enriched gaseous stream into a second power generating means.

BRIEF DESCRIPTION OF THE DRAWINGS

The integrated nature of the present invention's steps will be better understood by referring to the following detailed description of preferred embodiments and the drawings referenced therein, in which.

Figure 1:
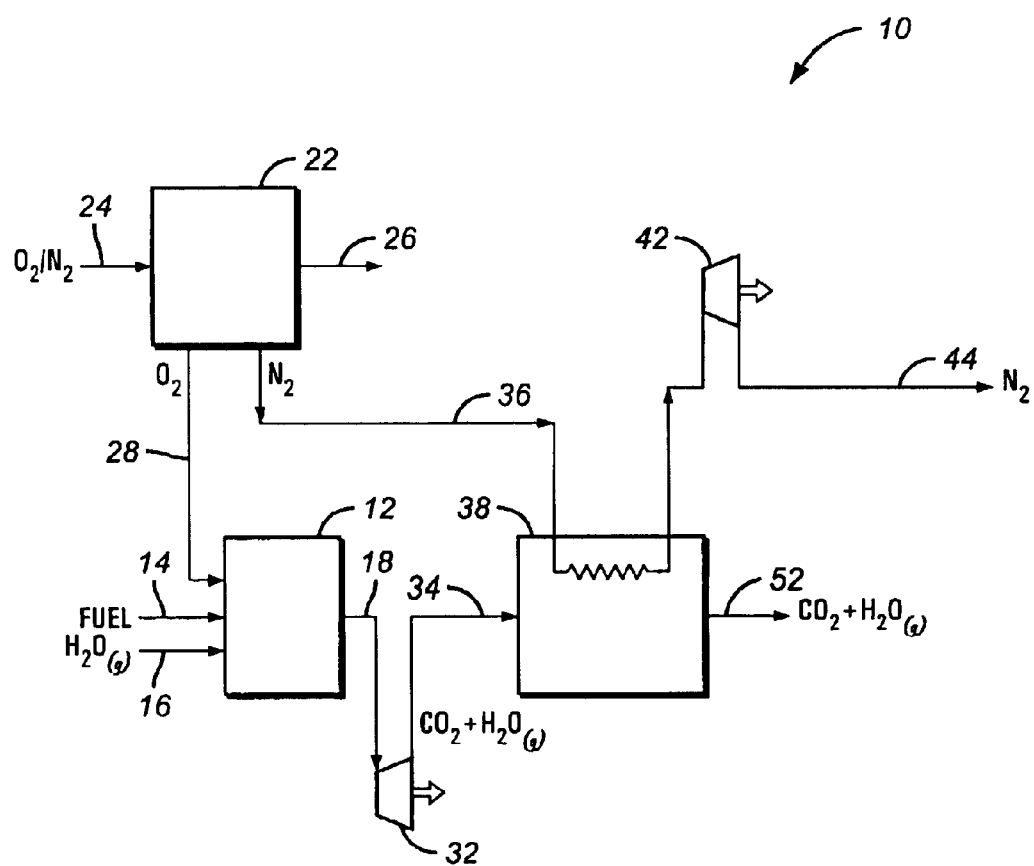
FIG. 1 is a flow diagram of one embodiment of the integrated process illustrating interdependent air separation and power generation using a flue gas and steam ("FG/S") stream exiting a combustor and an $N_2$-enriched stream produced by air separation and heated with residual heat from the FG/S stream.

In the drawings, $O_2/N_2$ means a source of oxygen and nitrogen, $O_2$ means an oxygen-enriched gas stream, $N_2$ means a nitrogen-enriched gas stream, $CO_2$ means a carbon dioxide-enriched gas stream, $H_2O_{(l)}$ means a liquid water-enriched stream and $H_2O_{(g)}$ means a vapor water (i.e., steam)-enriched stream. "$CO_2+H_2O_{(g)}$" is a mixture of at least carbon dioxide and steam and "$N_2+H_2O_{(g)}$" is a mixture of at least nitrogen and steam.

DETAILED DESCRIPTION OF PREFERRED EMBODIMENTS

Definitions

By "air separation unit" or "ASU" we mean any gas or liquid separating means and process of using the means for separating two or more gaseous and/or liquid components including, without limitation, a membrane system, cryogenic system, vacuum swing adsorption (VSA) system, pressure swing adsorption (PSA) system, temperature swing adsorption (TSA) system and combinations thereof. The ASU may be on-site or $O_2$ and/or $N_2$ gas streams may be transported, for example, by pipeline from an ASU at a remote location.

By "$O_2/N_2$ source" we mean any mixture, whether in a gaseous state, liquid state or combination thereof, comprising at least $O_2$ and $N_2$, which may be separated into at least an $O_2$-enriched stream and $N_2$-enriched gas stream.

By "gas", we mean that the stream is primarily gaseous, but may have entrained solid particulates or liquid.

By "enriched", we mean that the major component of the gaseous stream exceeds the average concentration of that same gaseous component in the earth's atmosphere. For example, as used herein, an "$O_2$-enriched gas stream" will have greater than about 21% by volume $O_2$ in the gas stream, a "$N_2$-enriched gas stream" will have greater than about 78% by volume $N_2$ in the gas stream, an "Ar-enriched gas stream" will have greater than about 0.9% by volume argon (Ar) in the gas stream, a "$CO_2$-enriched gas stream" will have greater than about $3\times10^{-2}$% by volume $CO_2$ in the gas stream, a "He-enriched gas stream" will have greater than about $5\times10^{-4}$% by volume helium (He) in the gas stream, a "Kr-enriched gas stream" will have greater than about $1\times10^{-4}$% by volume krypton (Kr) in the gas stream, a "Xe-enriched gas stream" will have greater than about $8\times10^{-6}$% by volume xenon (Xe) in the gas stream and so on. Accordingly, a single gas stream may be "enriched" with one or more gaseous components of interest.

By "high pressure" or "higher pressure" we mean a pressure that is greater than or equal to about 3 bar (300 kPa or 44.1 psi). When used herein, reference to pressure units will be absolute, unless otherwise stated.

"Efficiency" of the integrated process is calculated as a ratio between the total output power resulting in the integrated process and the theoretical heat input arising from the fuel introduced into the boiler(s).

Process Overview

An integrated process for air separation and power generation produces power from a high pressure $O_2$-enriched gas stream and a high pressure $N_2$-enriched gas stream from an $O_2/N_2$ source separated in an air separation unit ("ASU"). At least a portion of the high pressure $O_2$-enriched gas stream is introduced to a combustor with fuel and steam to produce a gas stream containing at least flue gas and steam ("FG/S stream"). Power is generated by passing the FG/S stream through a first power generating means, for example, a gas turbine.

The high pressure $N_2$-enriched gas stream is heated and power is generated from the heated high pressure $N_2$-enriched gas stream using a second power generating means, for example, a gas turbine.

Preferably, steam used in the combustor is produced by heating a liquid water-enriched stream in a boiler with residual heat in the FG/S stream exiting the gas turbine. A portion of the steam-enriched stream can be used as a source of industrial steam.

The overall process efficiency of the integrated process is preferably in a range of from about 40% to about 70%.

Referring now to FIG. 1, an integrated system 10 for air separation and power generation of the present invention has an ASU 22 for separating an $O_2/N_2$ source, for example air 24, into a high pressure $O_2$-enriched gas stream 28 and a high pressure $N_2$-enriched gas stream 36. A combustor 12 is used for burning fuel 14 and the high pressure $O_2$-enriched gas stream 28. Power is generated from the FG/S stream 18 exiting the combustor 12 by passing the FG/S stream 18 through a power generating means, for example a gas turbine 32. Power is also generated from a heated $N_2$-enriched gas stream 36 in a power generating means, for example a gas turbine 42.

Air Separation

The ASU 22 produces a high pressure $O_2$-enriched gas stream 28 and a high pressure $N_2$-enriched gas stream 36 from an $O_2/N_2$ source 24, such as air. The $O_2/N_2$ source 24 introduced to the ASU 22 is separated into the desired products 26 including, without limitation, one or more of oxygen, nitrogen, argon, helium, krypton and xenon, independently in liquid or gaseous form. The production of each of these components can be varied, in order to meet customer demands.

Figure 7:
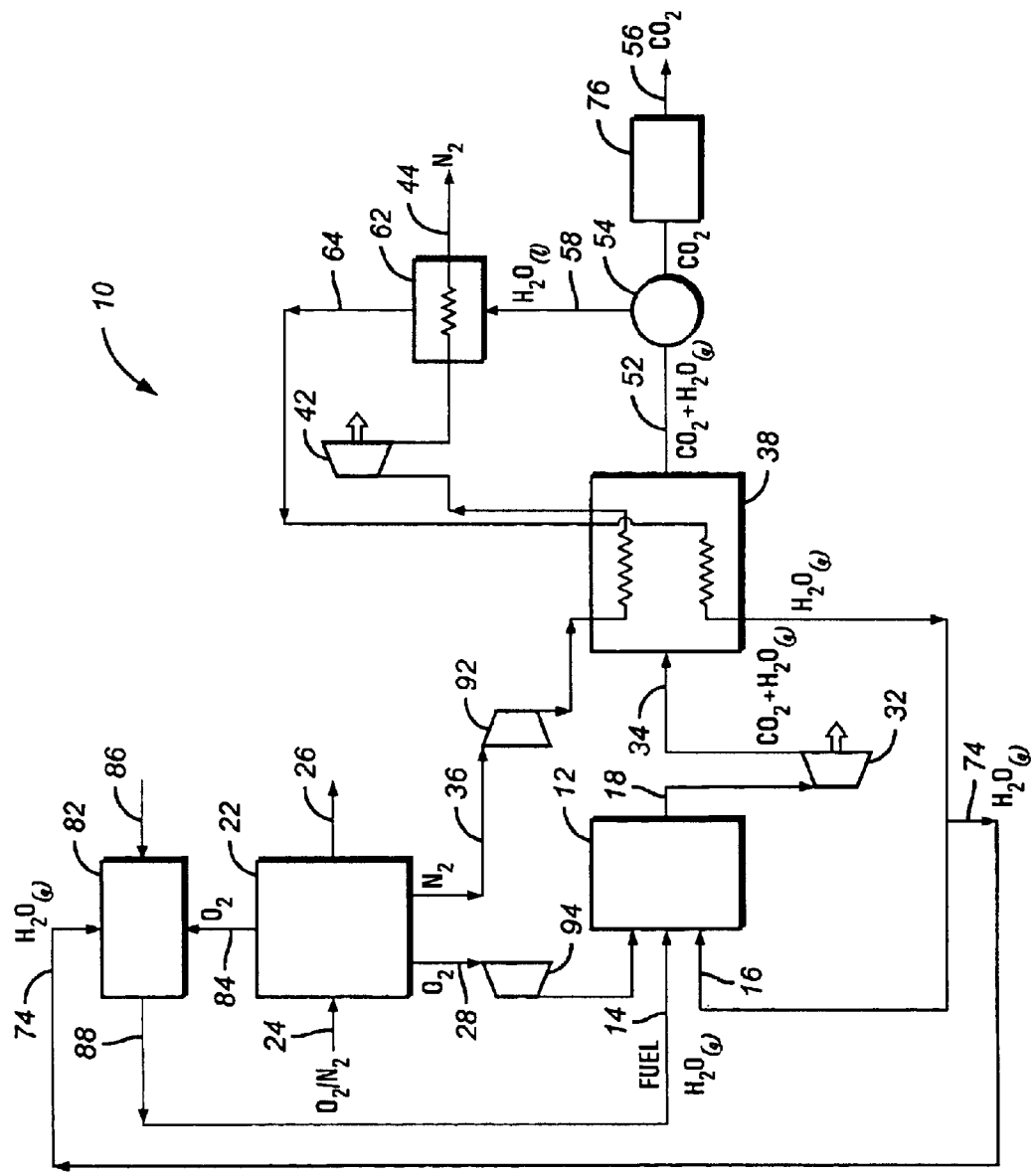
FIG. 7 is a flow diagram of another embodiment of the integrated process illustrating that the $O_2$ enriched gaseous stream is pressurized via compression prior to being introduced to the combustor.

The high pressure $O_2$-enriched gas or liquid stream 28 and high pressure $N_2$-enriched gas or liquid stream 36 each have a pressure of at least about 3 bars (300 kPa). Depending on the type of ASU used, each of the $O_2$-enriched and $N_2$-enriched gas streams may require further compression to raise the pressure to at least about 3 bars (300 kPa), for example using compressors. For example, a compressor 92, illustrated in the embodiment of FIG. 7, can be used to compress the $N_2$-enriched gas stream 36. A comparable compressor 94 can be used to compress the $O_2$-enriched gas stream.

The ASU 22 can be, for example, without limitation, a cryogenic unit, a membrane unit, a vacuum swing adsorption (VSA) system, a pressure swing adsorption (PSA) system, a temperature swing adsorption (TSA) system or a combination thereof. The ASU 22 may be on-site or $O_2$- and/or $N_2$-enriched gas streams may be transported, for example, by pipeline from an ASU 22 at a remote location.

Figure 6:
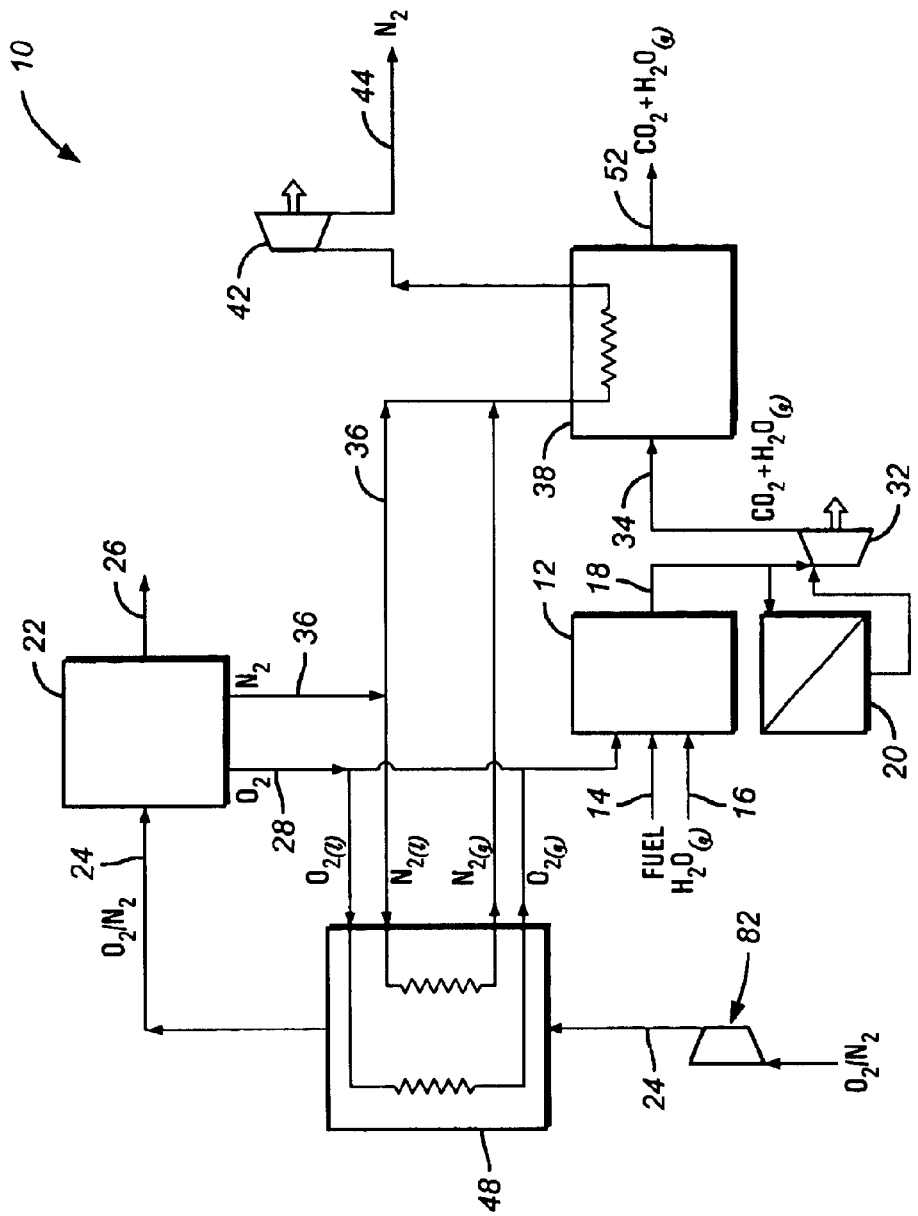
FIG. 6 is a flow diagram of another embodiment of the integrated process illustrating that both $N_2$ and $O_2$ enriched gaseous streams are pressurized in the ASU and heated in a heat exchanger. It also reflects that an $O_2/N_2$ source is compressed prior to being separated. Additionally, a modified combustion mixture is filtered prior to being directed to the first means for generating power.

Optionally, the $O_2/N_2$ stream 24 feed to the ASU 22 is compressed as illustrated in FIG. 6, to a pressure in a range of from about 3 bar (300 kPa) to about 25 bar (2,500 kPa) prior to being separated.

When trace impurities in the liquid and/or gaseous feed stream can lead to the combination of a combustible impurity with an oxidant (e.g., acetylene in an $O_2$-enriched gas or liquid) a potential explosion hazard exists. Accordingly, special precautions should be taken to reduce and/or eliminate that explosion hazard as well as any other potential explosion hazards. Thus, use of any potential ignition source should be kept to a minimum, if not eliminated, particularly in $O_2$-enriched gas compression and in systems for handling $O_2$-enriched gas at elevated pressures.

Also, when air is used as the $O_2/N_2$ source, it should be treated prior to introducing it to the ASU 22. The air treatment process can include, without limitation, a filtering step to remove and/or reduce to acceptable limits potential gas stream contaminants (e.g., particulates and hydrocarbons, if any) and a gas compressing step, in accordance with appropriate safety precautions. Also, procedures should be implemented to protect personnel working around any cryogenic process (e.g., exposure to cryogenic burns and asphyxia) and any high temperature and pressure process, as well as to protect the equipment used in and around those processes.

At least a portion of the high pressure $O_2$-enriched gas stream 28 produced in the ASU 22 is used as an input for the combustor 12.

The high pressure $O_2$-enriched gas stream 28 can be produced in the ASU 22 in a number of ways. For example, an $O_2$-enriched gas stream 28 produced in the ASU 22 can be compressed in a post-air separation compressor (not shown). Alternatively, a pressurized $O_2$-enriched substantially liquid stream may be produced using the ASU 22 by pressurizing liquid $O_2$, produced in the ASU 22, with a pumping action, as illustrated in FIG. 6. In this alternative case, the pressurized $O_2$-enriched substantially liquid stream is then passed through a heat exchanger 48 that heats and vaporizes the $O_2$-enriched stream while cooling the air stream fed to ASU 22.

In any case, the integrated process efficiency is increased by using a high pressure $O_2$-enriched gas stream 28 having a pressure of at least about 3 bars (300 kPa). Preferably, the pressure of the $O_2$-enriched gas stream 28 is in a range of from about 3 bars (300 kPa) to about 300 bars (30,000 kPa). More preferably, the pressure of the $O_2$-enriched gas stream is in a range of from about 10 bars (1,000 kPa) to about 150 bars (15,000 kPa). Most preferably, the pressure is in a range of from about 12 bars (1,200 kPa) to about 50 bars (5,000 kPa).

At least a portion of the high pressure $N_2$-enriched gas stream 36 produced in the ASU 22 is used as an input for $N_2$ power generation.

The high pressure $N_2$-enriched gas stream 36 may be produced in the same manner as the high pressure $O_2$-enriched gas stream 28. Preferably, the pressure of the $N_2$-enriched gas stream is in a range of from about 3 bars (300 kPa) to about 50 bars (5,000 kPa). More preferably, the pressure of the $N_2$-enriched gas stream is in a range of from about 10 bars (1,000 kPa) to about 40 bars (4,000 kPa). Most preferably, the pressure is in a range of from about 12 bars (1,200 kPa) to about 30 bars (3,000 kPa).

Combustion & FG/S Power Generation

The combustor 12 is used for burning fuel 14 and the $O_2$-enriched gas stream 28. As the fuel burns, flue gas is produced. An advantage of using an $O_2$-enriched gas stream as an oxidant for fuel combustion is that combustion is more complete. A further advantage of an $O_2$-enriched feed is that $NO_x$ production is reduced because the primary source of nitrogen for producing $NO_x$ has been substantially reduced with the ASU 22.

However, using an $O_2$-enriched gas stream results in an increased combustion temperature and, therefore, the flue gas produced has an elevated temperature. Though dependent on the type of fuel and the $O_2$ content in the $O_2$-enriched gas stream, the combustion temperature is typically in a range of from about 3,200° C. to about 3,700° C. (from about 5,800° F. to about 6,700° F.). However, typical materials of construction for gas turbines often used for generating power from flue gas cannot tolerate such high temperatures.

Therefore, in accordance with the invention, a steam-enriched stream 16 is used, among other factors, to control the combustion temperature at a predetermined temperature less than that which would be produced using a steam-free combustion mixture comprising the same fuel and $O_2$-enriched gaseous stream. For example, the combustion and flue gas temperature can be reduced to about 1,200° C. (2,200° F.) by adding steam. The predetermined temperature is a function of, for example, without limitation, the materials of construction for the combustor 12 and gas turbine 32 and the concentration of $N_2$ present, if any, in the combustor 12. Specifically, keeping the FG/S stream's temperature from exceeding its maximum admissible value to the gas turbine 32, which can vary based on various operating conditions, will help improve the integrated process efficiency, while reducing gas turbine corrosion and related maintenance costs. Accordingly, steam is, among other things, a combustion mixture modifying agent used for controlling the combustion temperature.

Preferably, $O_2$ and fuel are introduced into the combustor 12 in about a stoichiometric ratio, depending on the fuel's chemical composition, for producing substantially $CO_2$ or $CO_2$ and $H_2O$ combustion products.

Suitable fuel for the combustor 12 and/or the boiler 38 is a gaseous, liquid or solid carbon-containing compound or a combination thereof. Examples of suitable fuels are natural gas, coal, coal slurries, petroleum coke, bitumen, fuel oil and waste fuel oil, gasification gas, syngas, coke oven gas, blast furnace gas and combinations thereof.

Preferably, the steam-enriched stream 16 is in a range from about 70 mol. % to about 99 mol. % of the total of the $O_2$-enriched gas stream, fuel and steam-enriched stream introduced in the combustor 12. More preferably, the steam-enriched stream 16 is in a range from about 75 mol. % to about 95 mol. % of the total of the $O_2$-enriched gas stream, fuel and steam-enriched stream introduced in the combustor 12. Most preferably, the steam-enriched stream 16 is in a range from about 80 mol. % to about 92 mol. % of the total of the $O_2$-enriched gas stream, fuel and steam-enriched stream introduced in the combustor 12.

The steam-enriched stream 16 is added before, during and/or after combustion in accordance with the desired combustor operating temperature and efficiency for the overall process. The amount of steam added to the combustion mixture is dependent on a number of factors including, without limitation, type of fuel, amount of $O_2$ in the $O_2$-enriched gas stream, combustion temperature, time at which steam is added relative to combustion, steam temperature and the desired FG/S stream exit temperature. Under certain conditions, deleterious coking may occur, possibly indicating a combustion temperature that is too low for maintaining a substantially complete combustion reaction (i.e., producing primarily $CO_2$ or $CO_2$ and $H_2O$). In such circumstances, it may be desirable to reduce the amount of steam added prior to or during combustion, in order to increase the combustion temperature and thereby decrease the extent of deleterious coking, if any.

Preferably, the gas within the combustor 12 is well-mixed and homogeneous. The FG/S stream 18 exiting the combustor 12 is comprised of at least flue gas and steam.

Power is generated by introducing at least a portion of the FG/S stream 18 from the combustor 12 into a power generating means, which may comprise a gas turbine 32. Because the gas entering the gas turbine 32 is a mixture of flue gas and steam, the turbine operates under a hybrid Rankine/Brayton cycle.

Using the steam-enriched stream 16 increases the power generated in the gas turbine by reducing the FG/S stream 18 inlet temperature and by increasing the mass flow rate through the gas turbine, as shown by the following equation (1):

$$W = \dot{m}(h_i - h_o) \quad (1)$$

where:

| | |
|---|---|
| W | is power produced (Btu); |
| $\dot{m}$ | is mass flow rate of gas (lb$_m$/hr); |
| $h_i$ | is specific enthalpy (i.e, heat content) of gas at gas turbine inlet (Btu/lb$_m$); and |
| $h_o$ | is specific enthalpy (i.e, heat content) of gas at gas turbine outlet (Btu/lb$_m$). |

The maximum gas temperature at the gas turbine inlet is limited by the turbine material's maximum admissible stress, which is exceeded when a steam-free fuel/$O_2$ combustion mixture is used. Steam is added to the combustion mixture, thereby reducing $h_i$. But, because steam addition increases the mass flow rate, the power generated by the turbine is increased.

The gas turbine 32 can be connected to a power generator (not shown) or a cycle compressor (not shown), such as, for example, without limitation, an ASU compressor, to generate power.

The FG/S stream 18 may be filtered before being directed to the power generating means. For example, it may be particularly advantageous to filter the FG/S stream 18 in filter 20, FIG. 6, when the fuel 14 used in the combustor 12 is coal. Other fuels that would preferably be filtered, as appropriate, would include, without limitation, petroleum coke, bitumen, fuel oil, waste fuel oil, each aforementioned fuel in combination with natural gas or a combination thereof. However, when the fuel is solely natural gas, filtration will not likely be required.

Filtration may be conducted in a manner known to those skilled in the art including, for example, without limitation, candle filters, cyclones and combinations thereof.

The FG/S stream 18 exiting the power generating means is subsequently fed to a boiler 38 for producing steam, heating the $N_2$-enriched gas stream 36 or a combination thereof.

$N_2$ Power Generation

The high pressure $N_2$-enriched gas stream 36 produced in the ASU 22 is heated and power is generated by introducing the heated high pressure $N_2$-enriched gas stream from the boiler 38 into a power generating means, which may comprise a gas turbine 42.

Figure 2:
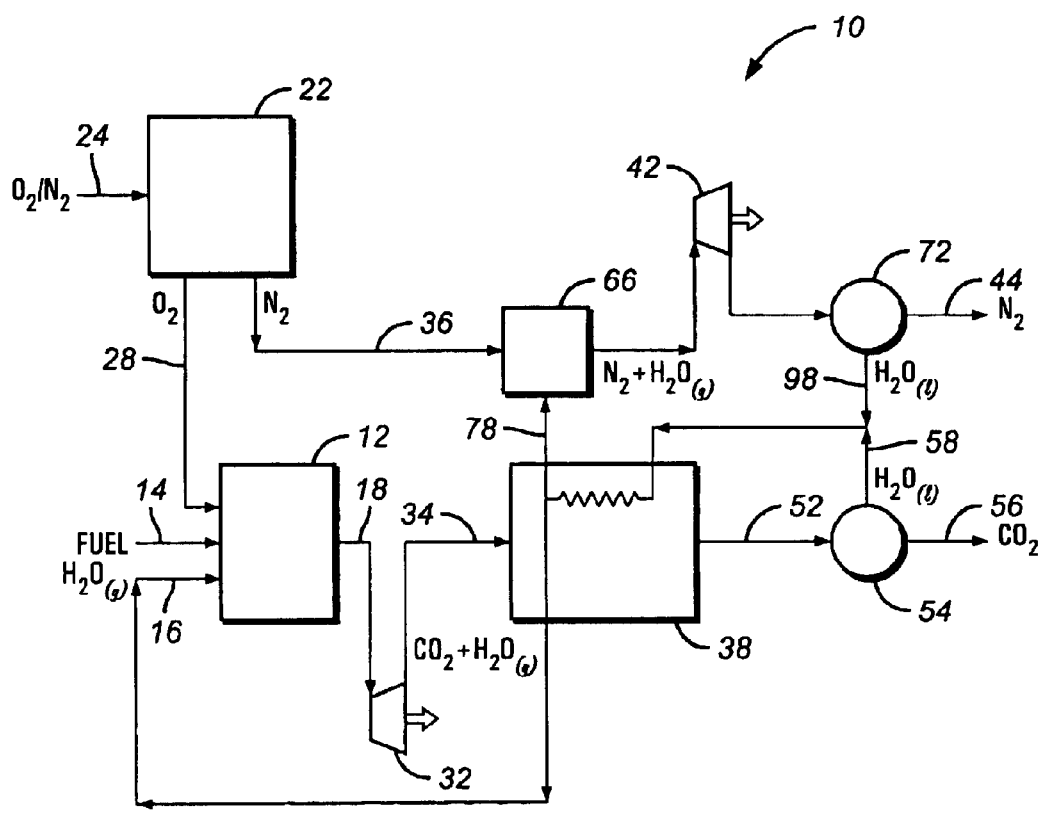
FIG. 2 is a flow diagram of another embodiment of the integrated process illustrating interdependent air separation and power generation, where steam is produced with residual heat from the FG/S stream and the $N_2$-enriched stream is heated by mixing with a portion of the steam.

Two embodiments for heating the $N_2$-enriched gas stream 36 are illustrated in FIGS. 1 and 2. In one embodiment, illustrated in FIG. 1, the $N_2$-enriched gas stream 36 is heated using residual heat from the FG/S stream 34 exiting the power generating means. As illustrated, the $N_2$-enriched gas stream 36 is heated in a heat exchanger associated with the boiler 38. Power is generated by passing the heated $N_2$-enriched gas stream 36 through gas turbine 42.

In another embodiment, illustrated in FIG. 2, the $N_2$-enriched gas stream 36 is heated by mixing with steam. Preferably, the steam is produced within the integrated air separation and power generation process. More preferably, a steam-enriched stream 78 is produced by heating with residual heat in the FG/S stream 34 exiting the power generating means, for example in a heat exchanger associated with the boiler 38. In this embodiment, the steam-enriched stream 78 and the $N_2$-enriched gas 36 are mixed in a mixer 66. Preferably, the steam-enriched stream 78 and the $N_2$-enriched gas 36 are introduced to the mixer 66 at substantially similar pressures.

The mixed $N_2$-enriched gas and steam-enriched ("$N_2$/S") stream 68 is then used for generating power in a manner similar to the power generated from the FG/S stream 18. An advantage of generating power from the $N_2$/S stream 68 is an increased mass flow rate, which according to equation (1), increases the power produced in the turbine 42. Because the gas entering the gas turbine 42 is a mixture of $N_2$ and steam, the turbine operates under a hybrid Rankine/Brayton cycle in the steam mixing embodiment.

The gas turbine 42 can be connected to a power generator (not shown) or a cycle compressor (not shown), such as, for example, without limitation, an ASU compressor, to generate power.

In the FIG. 2 embodiment, the $N_2$/S stream exiting the gas turbine 42 is then treated in condenser 72 to separate a water-enriched stream 98 from the $N_2$-enriched gas stream 44. Preferably, the water-enriched stream 98 is mixed with the water-enriched stream 58 and heated in boiler 38.

Alternatively, a combination of steam mixing and heat transfer with the FG/S stream can be used to heat the $N_2$-enriched gas stream 44.

The temperature of the high pressure $N_2$-enriched gas stream 36 prior to heating is dependent on the ASU 22 and any subsequent compression or heat exchange, but typically is in a range of from about 30° C. to about 500° C. (from about 85° F. to about 950° F.). In the embodiment where the $N_2$-enriched gas stream 36 is heated in a heat exchanger associated with the boiler 38, the heated $N_2$-enriched gas stream is preferably at a temperature in a range of from about 800° C. to about 1,500° C. (from about 1,450° F. to about 2,700° F.). In the steam mixing embodiment, the $N_2/S$ stream 68 is preferably at a temperature in a range of from about 250° C. to about 650° C. (from about 480° F. to about 1,200° F.).

Examples of suitable boilers 38 are pulverized solid fuel boilers, pulverized liquid fuel boilers, fluidized bed boilers, natural gas-fired boilers, fire tube boilers, firebox boilers, and water tube boilers.

Preferably, the boiler 38 operates at a pressure in a range of from about 1 bar (100 kPa) to about 5 bars (500 kPa). More preferably, the boiler 38 operates at a pressure in a range of from about 1 bar (100 kPa) to about 3 bars (300 kPa). Most preferably, the boiler 38 operates at a pressure in a range of from about 1 bar (100 kPa) to about 1.5 bars (150 kPa).

Additional fuel, high pressure $O_2$-enriched gas stream and/or steam is optionally introduced into a burner in or connected to the boiler 38.

Optionally, any residual thermal energy of the $N_2$-enriched gas stream exiting the power generation means is used in a heat exchanger 62 (see FIGS. 4 and 5), for example, to preheat water entering the boiler 38. The use of the $N_2$-enriched gas stream for generating power and, optionally, for heat exchange in the heat exchanger 62 are important to achieving the desired overall process efficiency, while significantly reducing gas turbine maintenance costs.

Also, the $N_2$-enriched gas stream 44 exiting the gas turbine 42 or the heat exchanger 62 may be used as a product. Depending on the requirements of the product, the $N_2$-enriched gas stream 44 may be treated to remove any impurities. Alternatively or additionally, the $N_2$-enriched gas stream 44 may be treated to produce a compressed gaseous product or a liquid $N_2$ product. Moreover, optionally, a portion of the $N_2$-enriched gas stream or liquid $N_2$ can be treated and recycled back to the boiler 38 as a high pressure gas input to its heat exchanger.

Steam Generation

Preferably, steam 16 introduced into the combustor 12 is produced in the integrated air separation and power generation process 10. More preferably, steam 16 is produced from a water-enriched stream 58 separated from the FG/S stream 52 exiting the boiler 38.

Figure 3:
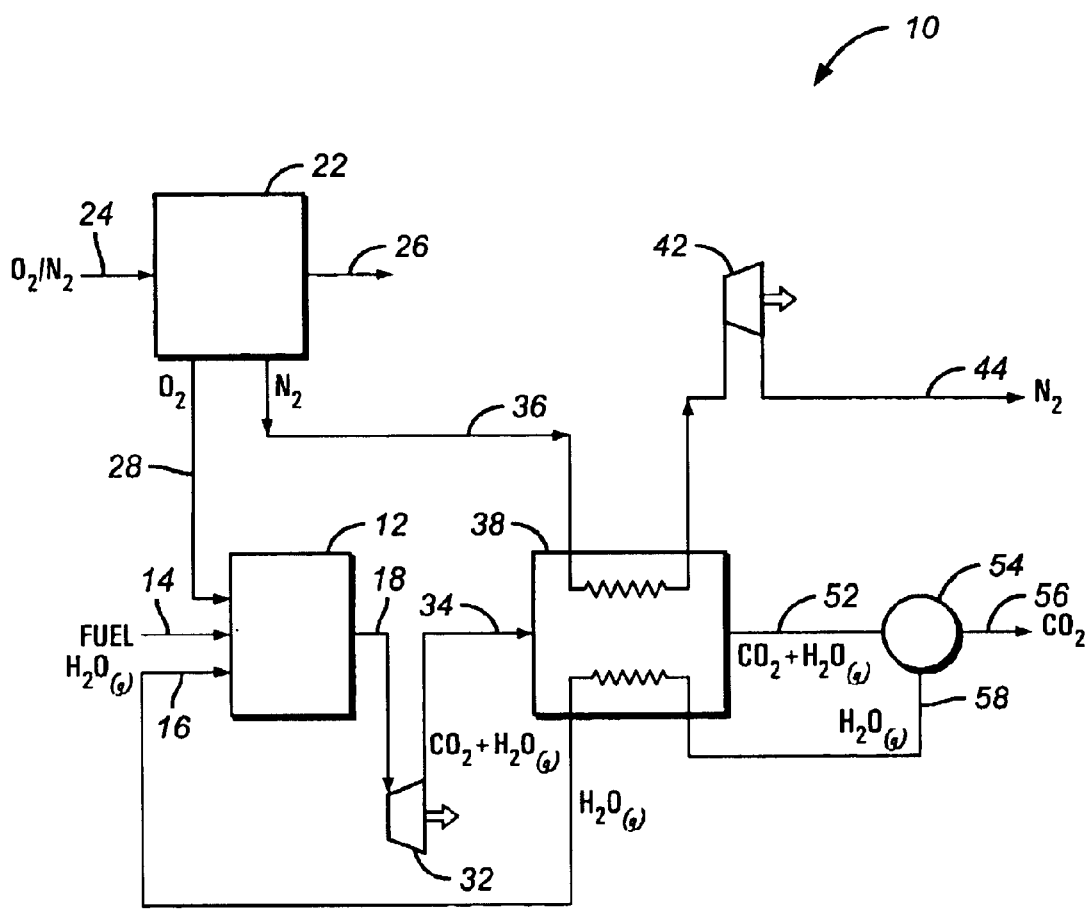
FIG. 3 is a flow diagram of yet another embodiment of the integrated process illustrating interdependent air separation and power generation with steam produced in a boiler with residual heat from the FG/S stream.
Figure 4:
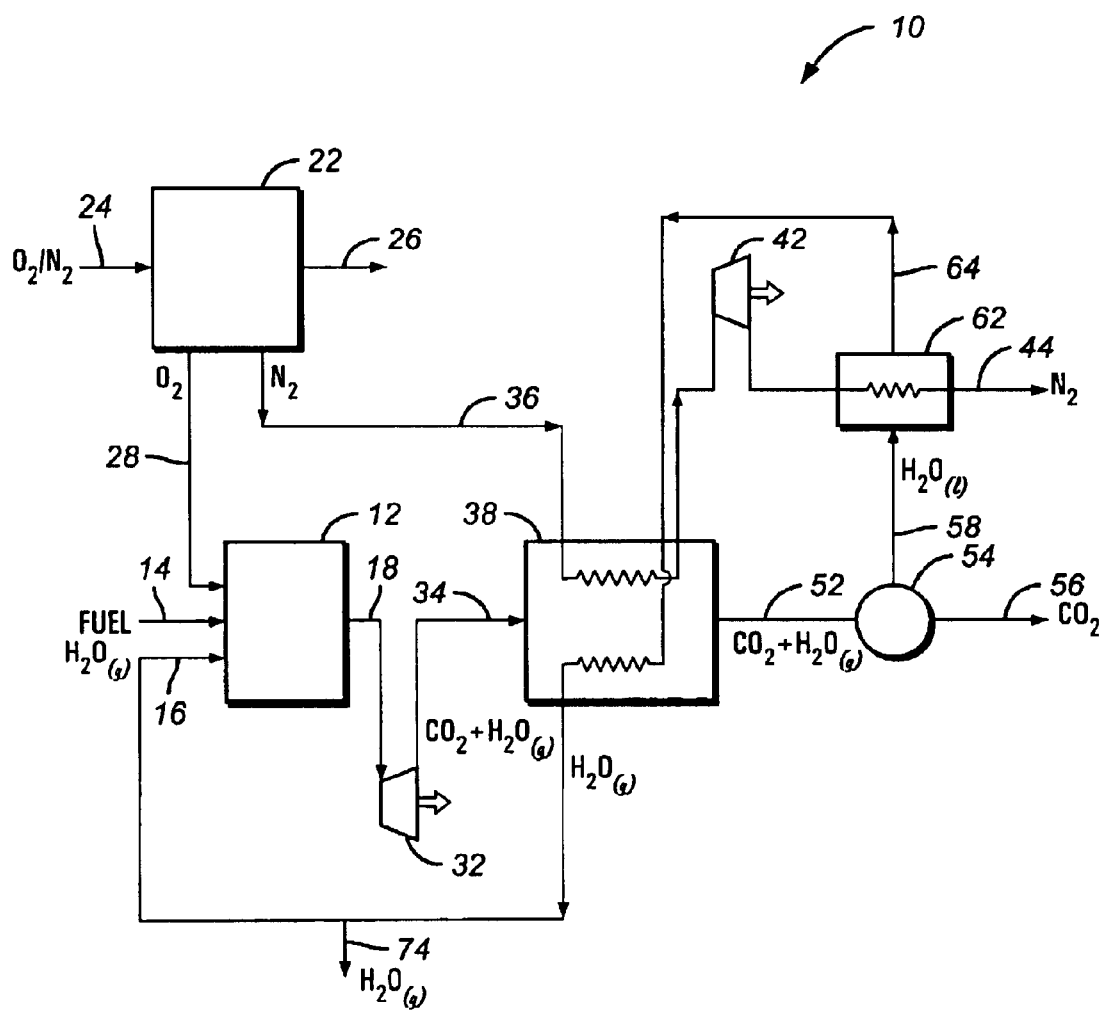
FIG. 4 is a flow diagram of a further embodiment of the integrated process illustrating interdependent air separation and power generation with a water-enriched stream preheated by residual heat from the $N_2$-enriched stream.
Figure 5:
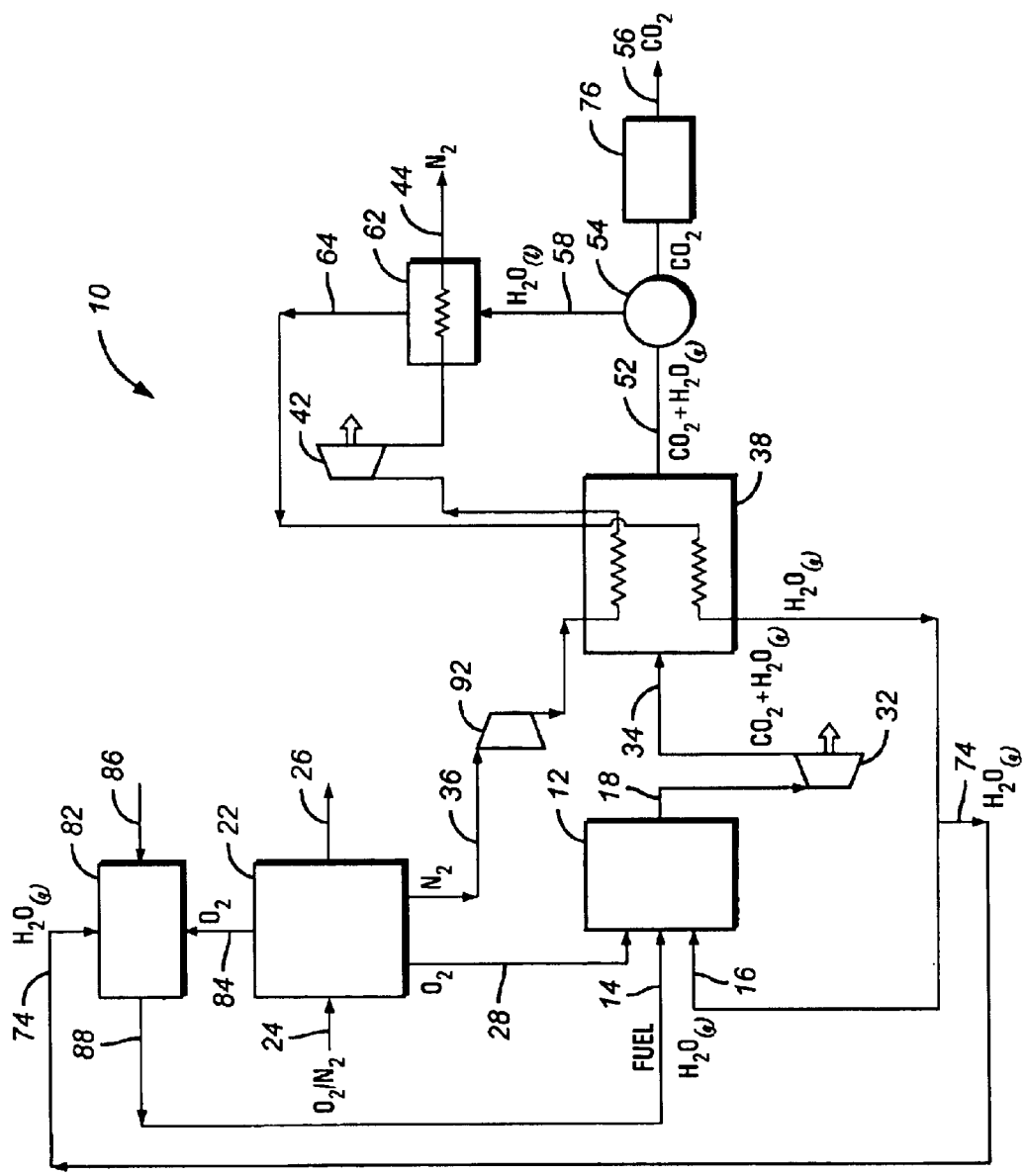
FIG. 5 is a flow diagram of yet another embodiment of the integrated process illustrating interdependent air separation and power generation with fuel gasification and $CO_2$-enriched stream treatment systems.

In one embodiment illustrated in FIGS. 3, 4 and 5, the FG/S stream 52 exiting the boiler 38 is condensed in condenser 54 to produce a $CO_2$-enriched stream 56 and a water-enriched stream 58. In the embodiment shown in FIG. 3, the water-enriched stream 58 is heated in the boiler 38 to produce a steam-enriched stream 16. Steam-enriched stream 16 is then injected into the combustor 12 and exits as part of the FG/S stream 18.

In the embodiments shown in FIGS. 4 and 5, the water-enriched stream 58 is preheated in a heat exchanger 62 by residual heat in the $N_2$-enriched gas stream exiting the gas turbine 42. The preheated water-enriched stream 64 exiting the heat exchanger 62 is then directed to boiler 38 for producing a steam-enriched stream. The steam-enriched stream produced in the boiler 38 preferably has a temperature in a range of from about 250° C. (480° F.) to about 650° C. (1,200° F.) and a pressure in a range of from about 3 bars (300 kPa) to about 300 bars (30,000 kPa). More preferably, the pressure of the steam-enriched gas stream is in a range of from about 10 bars (1,000 kPa) to about 150 bars (15,000 kPa). Most preferably, the pressure is in a range of from about 12 bars (1,200 kPa) to about 50 bars (5,000 kPa). The upper limit of steam pressure is largely limited by the equipment capacity. Generally, the efficiency of the integrated air separation and power generation process increases with increasing steam pressure.

Preferably, there is substantially no $CO_2$ present in the steam-enriched stream 16.

Optionally, as shown in FIGS. 4 and 5, a portion of the steam produced in the boiler 38 may be used as industrial steam 74 in other areas of the plant.

Flue Gas Treatment

In one preferred embodiment, shown in FIGS. 3, 4 and 5, the FG/S stream 52 exiting the boiler 38 is condensed in condenser 54 to separate a $CO_2$-enriched stream 56 and a water-enriched stream 58. Furthermore, one preferred aspect of this embodiment is illustrated in FIG. 5. In this preferred aspect, the $CO_2$-enriched stream exiting the condenser 54 is treated in flue gas treatment system 76 to produce a treated $CO_2$-enriched stream.

The composition of the FG/S stream depends on the type of fuel, the composition and concentration of the oxidant, the concentration of injected steam, and the C:H ratio of the fuel. However, a typical FG/S stream 52 exiting the boiler 38 flue gas contains:

from about 2 to about 20 mol. % $CO_2$
from about 80 to about 92 mol. % $H_2O$
Trace amounts of $NO_x$, $SO_x$ and ash In the flue gas treatment system 76, the $CO_2$-enriched stream exiting the condenser 54 may be treated to remove or convert ash, other particulate matter, $NO_x$ and $SO_x$ produced in the combustor 12 and/or the burner of the boiler 38. $NO_x$ and $SO_x$ can be removed or converted by techniques known to those skilled in the art, including for example, without limitation, scrubbers, catalytic devices and combinations thereof.

Ash and other particulate matter can be removed by techniques known to those skilled in the art, including for example, without limitation, scrubbers, impingement separators, cyclone separators, centrifugal separators, filters, cyclones and combinations thereof.

Furthermore, the flue gas treatment system 76 may also be used to remove any residual water remaining in the $CO_2$-enriched stream after condensing the FG/S stream 52 in condenser 54. This residual water may be removed by techniques known to those skilled in the art, including for example, without limitation, additional condensers, separators and combinations thereof.

In one embodiment, the $CO_2$-enriched stream may be liquefied in the flue gas treatment system 76 to produce a liquid $CO_2$ product. The $CO_2$-enriched stream may be liquefied by compression and cooling. The $CO_2$-enriched product that can be used in numerous applications, including, for example, without limitation, water treatment, beverages, and chemical industry.

Advantageously, rare gases, such as Ar, Xe, and Kr, may also be separated from the flue gas in the flue gas treatment system 76. Rare gases can be separated using, for example, without limitation, a distillation column (not shown) or controlled freezing zone process. Other means will be apparent to those skilled in the art of separating rare gases.

Fuel Gasification

In another aspect of the embodiment illustrated in FIG. 5, fuel is treated, prior to combustion, in a gasification unit 82. In this embodiment, solid or liquid fuel 86, such as, without limitation, coal, char, biomass and oil residue, is oxidized by reaction with an $O_2$-enriched gas 84 produced in the ASU 22 and steam-enriched stream 74 to produce syngas, comprised of CO and $H_2$. Alternatively, steam and/or water from another point in the integrated air separation and power generation process. For example, stream 64 exiting the heat exchanger 62 may be fed to the gasification unit 82.

As compared with the combustor, steam acts as a reactant in the reaction producing syngas. Also, the amount of $O_2$ added in the gasification unit 82 is generally less than the amount of $O_2$ added to the combustor. Preferably, the ratio of $O_2$:C added to the gasification unit is less than 0.5. More preferably, the $O_2$:C ratio is in a range of from about 0.1 to about 0.4.

Preferably, syngas 88 is used as fuel in the combustor 12.

EXAMPLES

ASPEN software was used for modeling the integrated process and to determine the efficiency of the process. Efficiencies in the range of from about 45% to about 70% were achieved for the integrated air separation and power generation process.

ASPEN software was also used to compare the integrated process efficiency with and without $N_2$ power generation. For a FG/S temperature of 2,600° F. (1,427° C.) at the outlet of the combustor, the overall process efficiency was 48.3% without $N_2$ power generation. Under the same conditions, except having the process further integrated with a $N_2$ power generation module (e.g., where $N_2$ discharge pressure=30 bar and $N_2$ discharge temperature was 2,000° F. (1,093° C.)), the overall process efficiency increased to 54.4%.

Preferred processes for practicing the invention have been described. It will be understood that the foregoing is illustrative only and that other embodiments of the integrated process can be employed without departing from the true scope of the invention defined in the following claims.

What is claimed is:

1. An integrated air separation and power generation process, comprising the steps of:
    (a) introducing an $O_2/N_2$ source to an air separation unit;
    (b) separating the $O_2/N_2$ source into at least an $O_2$-enriched gaseous stream and an $N_2$-enriched gaseous stream;
    (c) introducing at least a portion of the $O_2$-enriched gaseous stream, having a pressure of at least about 3 bars (300 kPa), and fuel to a combustor to produce a combustion mixture;
    (d) burning the combustion mixture to produce at least a flue gas;
    (e) injecting steam into the combustor during the combustion mixture burning step, to produce a modified combustion mixture of at flue gas and steam (resulting in a FG/S stream);
    (f) generating power by introducing the modified combustion mixture exiting the combustor into a first power generating means;
    (g) heating at least a portion of the $N_2$-enriched gaseous stream, having a pressure of at least 3 bars (300 kPa);
    (h) generating power by introducing the heated $N_2$-enriched gaseous stream into a second power generating means; and wherein the injected steam is in a range of about 70 mol. % to about 99 mol. % of the total of the $O_2$-enriched gaseous stream, fuel, and steam in the combustor.

2. The process of claim 1, wherein the steam injected into the combustor contains substantially no $CO_2$ prior to injection.

3. The process of claim 1, wherein the steam injected into the combustor is used to control the combustor's temperature at a predetermined temperature less than the combustion temperature would be using a steam-free combustion mixture comprising the same fuel and $O_2$-enriched gaseous stream.

4. The process of claim 1 wherein the $N_2$-enriched gaseous stream is heated in a heat exchanger using residual heat from the FG/S stream exiting the first power generating means.

5. The process of claim 1 wherein $N_2$-enriched gaseous stream is heated by mixing with steam.

6. The process of claim 1, further comprising the step of:
    (i) condensing the modified combustion mixture in a condenser to separate water and $CO_2$.

7. The process of claim 6, further comprising the step of:
    (j) directing the water exiting the condenser to a boiler to produce steam.

8. The process of claim 7, wherein the steam produced in step (j) is injected into the combustor of step (e).

9. The process of claim 7 wherein the steam is mixed with the $N_2$-enriched gaseous stream in step (g).

10. The process of claim 7 wherein the steam exiting the boiler has a pressure in a range of from about 3 bars (300 kPa) to about 300 bars (30,000 kPa).

11. The process of claim 7 wherein the steam exiting the boiler has a temperature in a range of from about 250° C. (480° F.) to about 650° C. (1,200° F.).

12. The process of claim 1 wherein the fuel is selected from the group consisting of gaseous, liquid and solid carbon-containing compounds.

13. The process of claim 1 wherein the $N_2$-enriched gaseous stream has a pressure in a range of from about 10 bars (1,000 kPa) to about 50 bars (5,000 kPa).

14. The process of claim 1 wherein the $N_2$-enriched gaseous stream is pressurized by compressing in a compressor prior to being heated.

15. The process of claim 1 wherein the $N_2$-enriched gaseous stream is pressurized in the air separation unit by pumping liquid nitrogen produced in the air separation unit to produce a pressurized $N_2$-enriched substantially liquid stream and heating the pressurized $N_2$-enriched substantially liquid stream in a heat exchanger while cooling compressed air.

16. The process of claim 1 wherein the $O_2$-enriched gaseous stream has a pressure in a range of from about 10 bars (1,000 kPa) to about 300 bars (30,000 kPa).

17. The process of claim 1 wherein the $O_2$-enriched gaseous stream is pressurized by compressing in a compressor prior to being introduced to the combustor.

18. The process of claim 1 wherein the $O_2$-enriched gaseous stream is pressurized in the air separation unit by pumping liquid oxygen produced in the air separation unit to produce a pressurized $O_2$-enriched substantially liquid stream and heating the pressurized $O_2$-enriched substantially liquid stream in a heat exchanger while cooling compressed air.

19. The process of claim 7 wherein the $N_2$-enriched gaseous stream exiting the second means for generating power is directed to a heat exchanger to heat the water exiting the condenser, prior to the water being directed to the boiler.

20. The process of claim 1 wherein the air separation unit is selected from the group consisting of a cryogenic unit, a membrane unit, a vacuum swing adsorption system, a pressure swing adsorption system, and a temperature swing adsorption system.

21. The process of claim 20 wherein the $O_2/N_2$ source is compressed prior to being introduced to the air separation unit.

22. The process of claim 1 wherein the modified combustion mixture is filtered prior to being directed to the first means for generating power.

23. The process of claim 6, further comprising directing the separated $CO_2$ from the condenser to a treatment system for producing a treated $CO_2$-enriched stream.

24. The process of claim 23, further comprising the step of liquefying the $CO_2$-enriched stream.

25. The process of claim 23, further comprising the step of separating a rare gas stream before, during or after the step of producing the $CO_2$-enriched stream.

26. The process of claim 25, wherein the rare gas stream is selected from the group consisting of Ar-enriched gas stream, Kr-enriched gas stream, Xe-enriched gas stream.

27. The process of claim 1 wherein the first and second means for generating power comprise at least a gas turbine.

28. The process of claim 12, further comprising introducing a fuel feedstock into a gasification unit for producing a gaseous fuel.

29. The process of claim 1 wherein the total efficiency of the integrated process is in a range of from about 40% to about 70%.

30. The process of claim 1, wherein injecting steam into the combustor can occur before or after the combustion mixture burning step to produce a modified combustion mixture of at least flue gas and steam (resulting in a FG/S stream).

* * * * *